United States Patent
Chen et al.

(10) Patent No.: US 8,687,058 B2
(45) Date of Patent: Apr. 1, 2014

(54) METHOD FOR SELECTING SENSOR NODES

(75) Inventors: Po-Yu Chen, Kaohsiung (TW); Yu-Chee Tseng, Hsinchu (TW); Wen-Tsuen Chen, Baoshan/Hsinchu County (TW)

(73) Assignee: National Tsing Hua University, Hsinchu (TW)

( * ) Notice: Subject to any disclaimer, the term of this patent is extended or adjusted under 35 U.S.C. 154(b) by 483 days.

(21) Appl. No.: 13/204,718

(22) Filed: Aug. 8, 2011

(65) Prior Publication Data

US 2012/0166155 A1 Jun. 28, 2012

(30) Foreign Application Priority Data

Dec. 22, 2010 (TW) .............................. 99145304 A

(51) Int. Cl.
*G01B 11/02* (2006.01)
*H04N 7/18* (2006.01)

(52) U.S. Cl.
CPC ................ *G01B 11/022* (2013.01); *H04N 7/18* (2013.01)
USPC ....................................................... 348/135

(58) Field of Classification Search
CPC .................................................... G01B 11/022
USPC ........................................................ 348/135
See application file for complete search history.

(56) References Cited

U.S. PATENT DOCUMENTS

| | | | | |
|---|---|---|---|---|
| 5,959,529 | A * | 9/1999 | Kail, IV ................... | 340/539.12 |
| 6,208,247 | B1 * | 3/2001 | Agre et al. ............... | 340/539.19 |
| 6,859,831 | B1 * | 2/2005 | Gelvin et al. ................. | 709/224 |
| 8,073,554 | B2 * | 12/2011 | Vezza et al. ..................... | 700/22 |
| 8,565,109 | B1 * | 10/2013 | Poovendran et al. ......... | 370/252 |
| 2011/0261738 | A1 * | 10/2011 | Mukherjee ..................... | 370/311 |
| 2012/0316838 | A1 * | 12/2012 | Wheeler et al. ............... | 702/188 |
| 2013/0041627 | A1 * | 2/2013 | Luo et al. ...................... | 702/188 |

* cited by examiner

*Primary Examiner* — Y Lee
*Assistant Examiner* — Irfan Habib

(57) ABSTRACT

The present invention relates to a method for selecting sensor nodes, the method is adopted for calculating the value of a contribution function for a plurality of objects contributed by a plurality of sensor nodes, wherein the contribution function value is calculated by way of determining a coverage level of the objects made by the sensor nodes, or by means of arranging a sub sensor node group capable of sensing covering an object group and calculating the value of the contribution function for the objects contributed by the sensor nodes; Therefore, through the method, the sensor nodes having maximum contribution to the objects can be selected and arranged in a specific environment, and the sensing direction of those sensor nodes can be adjusted for making the sensor node group performs the best efficiency.

12 Claims, 17 Drawing Sheets

METHOD FOR SELECTING SENSOR NODES

CROSS-REFERENCE TO RELATED APPLICATION

This application claims foreign priority from a Taiwan Patent Application, Ser. No. 099145304, filed on Dec. 22, 2010.

BACKGROUND OF THE INVENTION

1. Technical Field

The present invention relates to a method for solving the coverage of sensor nodes, and more particularly, to a method for selecting sensor nodes, in which the sensor nodes having best sensing coverage can be selected by way of determining a coverage level of the objects made by the sensor nodes and calculating the value of a contribution function for the objects contributed by the sensor nodes

2. Description of Related Art

Wireless sensor network consists of a plurality of sensor nodes, in which, each sensor node is responsible for collecting, processing, and storing the environment data. Moreover, the sensor node can communicate with any adjacent sensor node. Since the sensor node of wireless sensor network has the above properties, it can be applied to many environmental sensing applications, such as video surveillance system, radiation sensing, and biochemistry sensing, etc.

However, the wireless sensor network has a foundation problem that is coverage problem. The coverage problem means a condition of a filed or an object that a sensor can monitor it; Moreover, with different monitoring environments, the wireless sensor network needs to deal with different coverage problems. So that, when we want to deploy the wireless sensor network in a particular environment, the coverage problem must be considered in advance. For instance, when the wireless sensor network is used for monitoring an art gallery, it is the classical coverage problem in the wireless sensor network, called art gallery problem (the art gallery problem is introduced in reference 1: O'Rourke, J. "Art Gallery Theorems and Algorithms", Oxford University Press, New York, 1987).

In addition to the coverage problem, the disposing points and the sensing directions of the sensor nodes are also the important considerations when we want to use the wireless sensor network to monitor a particular environment area. Please refer to FIG. 1, which illustrates the schematic view of a conventional surveillance system with wireless sensor network, as shown in FIG. 1, when an object O' enters the covering range of the wireless sensor network, the surveillance ranges of three surveillance devices S1', S2', and S3' fully cover the object O'. Please simultaneously refer to FIG. 2, which shows the image diagram of the object captured by these surveillance devices. As shown in FIG. 2, P1', P2', and P3' are the object images of the object O' captured by the surveillance device S1', S2', and S3', respectively. Obviously, The covering ranges of three surveillance devices S1', S2', and S3' fully cover the object O', however, the images captured by the three surveillance devices can not facilitate people recognize the identification of the object O'.

Please refer to FIG. 3 and FIG. 4, which illustrate another schematic view of the conventional surveillance system with wireless sensor network and its image diagram of the object captured by the surveillance device, respectively. As shown in FIG. 3, based on the three surveillance devices S1', S2', and S3' fully cover the object O', the three surveillance devices S1', S2', and S3' are respectively disposed and two adjacent surveillance devices have a particular included angle, so as to make the three surveillance devices S1', S2', and S3' be able to capture the back, the left side, and the right side of the object O', so that people can recognize the identification of the object O' easily, as shown in FIG. 4.

Thus, through above descriptions, it is able to know that, when we want to use the wireless sensor network to monitor or sense a particular region, we should consider not only the coverage problem but also the disposing points and the sensing directions of sensor nodes. So, the wireless sensor network may perform the best monitoring/sensing efficiency.

Accordingly, based on the above reasons, the inventor of the present application has made great efforts to make inventive research thereon and eventually provided a method for selecting sensor nodes, so as to facilitate the wireless sensor network perform the best efficiency when it is applied to monitor or sense the particular environment.

BRIEF SUMMARY OF THE INVENTION

The primary objective of the present invention is to provide a method for selecting sensor nodes, in which a coverage level of a plurality of objects made by a plurality of sensor nodes would be determined and a contribution function for the objects contributed by the sensor nodes would also be calculated, so that the sensor nodes having maximum contribution to the objects can be selected and arranged in a specific environment, and the sensing direction of those sensor nodes can be adjusted for making the sensor node group performs the best efficiency.

The another objective of the present invention is to provide a method for selecting sensor nodes, in which a sub sensor node group capable of sensing covering an object group would be arranged and the value of the contribution function for the objects contributed by the sensor nodes would also be calculated, such that the sensor nodes having maximum contribution to the objects can be selected and arranged in a specific environment, and the sensing direction of those sensor nodes can be adjusted for making the sensor node group performs the best efficiency.

Accordingly, to achieve the abovementioned primary objective of the present invention, the inventor proposes a method for selecting sensor nodes, comprising:

(1) determining a sensor node group $S=\{s_1, s_2, \ldots, s_i\}$ and an object group $O=\{o_1, o_2, \ldots, o_j\}$;
(2) determining a coverage level $o_{j.level}$ of a plurality of objects $o_j$ in the object group O, respectively;
(3) calculating a first contribution function of a plurality of sensor nodes $s_i$ in the sensor node group S;
(4) selecting the sensor node $s_i$ having the maximum first contribution function value;
(5) directing the sensor node $s_i$ toward a sensing direction $\alpha_i$;
(6) changing the state of the sensor node $s_i$ to a fixed state;
(7) removing the sensor node $s_i$ in the fixed state from the sensor node group S;
(8) determining whether all of the sensor nodes $s_i$ are in the fixed state, if yes, proceeding to step (9), otherwise, repeatedly proceeding to the step (2);
(9) determining whether the value coverage level of all objects in the object group is equal to a default value k, if yes, proceeding to step (10), otherwise, repeatedly proceeding to the step (2); and
(10) determining whether there are no sensor nodes in an undecided state can make the contributions to the coverage level $o_{j.level}$ of the plurality of objects $o_j$, if yes, ending the step, otherwise, repeatedly proceeding to the step (2).

Moreover, for achieving the abovementioned another objective of the present invention, the inventor proposes a method for selecting sensor nodes, comprising:

(A) determining a sensor node group $S=\{s_1, s_2, \ldots, s_i\}$ and an object group $O=\{o_1, o_2, \ldots, o_j\}$;
(B) determining a sub sensor node group C' of the sensor node group S capable of providing the sensing coverage to the object group O, and calculating a coverage level $o_{j.level}$ of a plurality of objects $o_j$ in the object group O, respectively;
(C) calculating a second contribution function of a plurality of sensor nodes $s_i$ having an undecided state in the sensor node group S;
(D) sorting all values in each the second contribution function;
(E) comparing the first values in the second contribution functions of all the sensor nodes $s_i$;
(F) selecting the sensor node $s_i$ having the maximum first value in the second contribution function thereof;
(G) directing the sensor node $s_i$ toward a sensing direction $\alpha_i$;
(H) changing the state of the sensor node $s_i$ to a fixed state;
(I) removing the sensor node $s_i$ in the fixed state from the sensor node group S;
(J) determining whether all of the sensor nodes $s_i$ are in the fixed state, if yes, proceeding to step (K), otherwise, repeatedly proceeding to the step (B);
(K) determining whether the value coverage level of all objects in the object group is equal to a default value k, if yes, proceeding to step (L), otherwise, repeatedly proceeding to the step (B); and
(L) determining whether there are no sensor nodes in an undecided state can make the contributions to the coverage level $o_{j.level}$ of the plurality of objects $o_j$, if yes, ending the step, otherwise, repeatedly proceeding to the step (B).

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe a method for selecting sensor nodes according to the present invention, embodiments of the present invention will be described in detail with reference to the attached drawings hereinafter.

Figure 1:
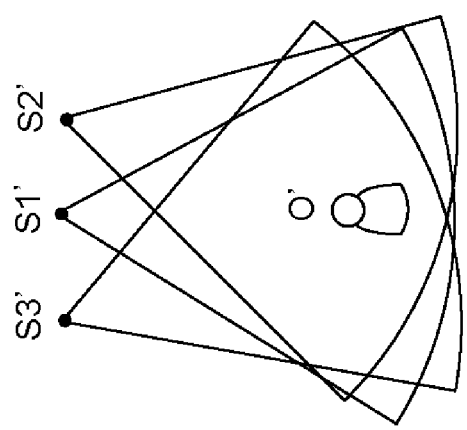
FIG. 1 is a schematic view of a conventional surveillance system with wireless sensor network.
Figure 2:
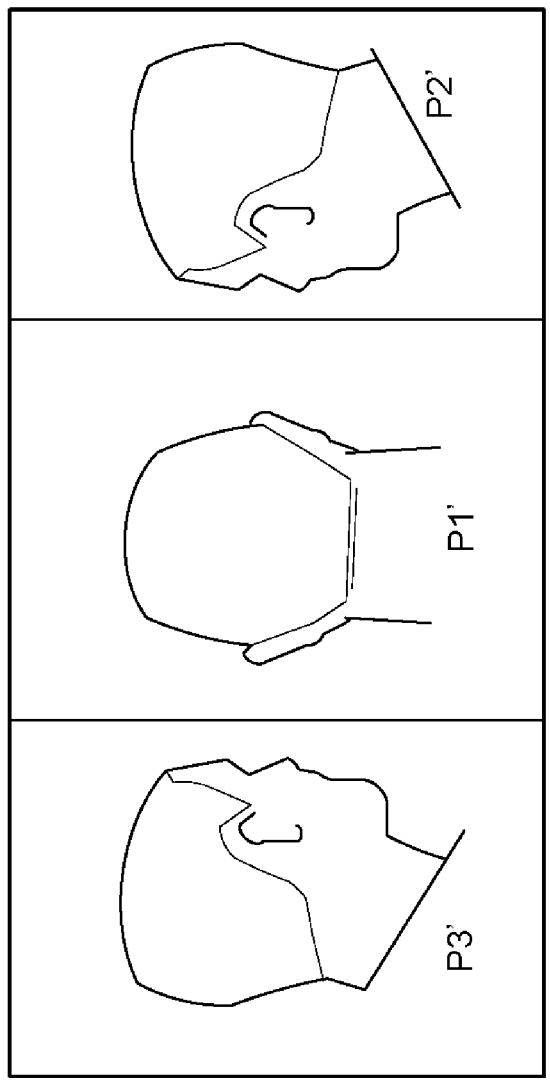
FIG. 2 is an image diagram of an object captured by a surveillance device.
Figure 3:
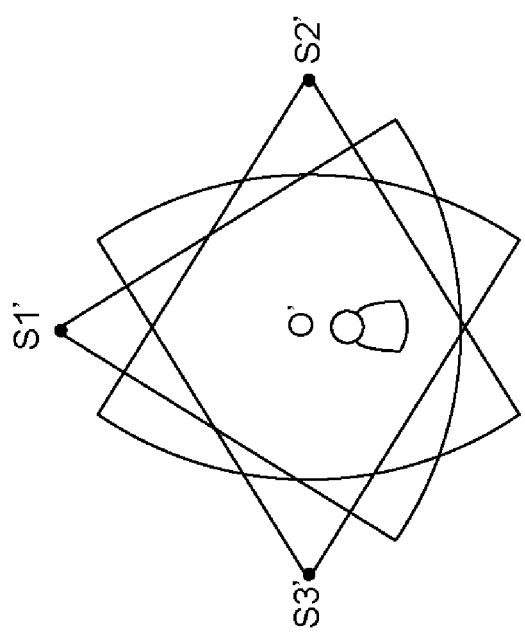
FIG. 3 is a second schematic view of the conventional surveillance system with wireless sensor network.
Figure 4:
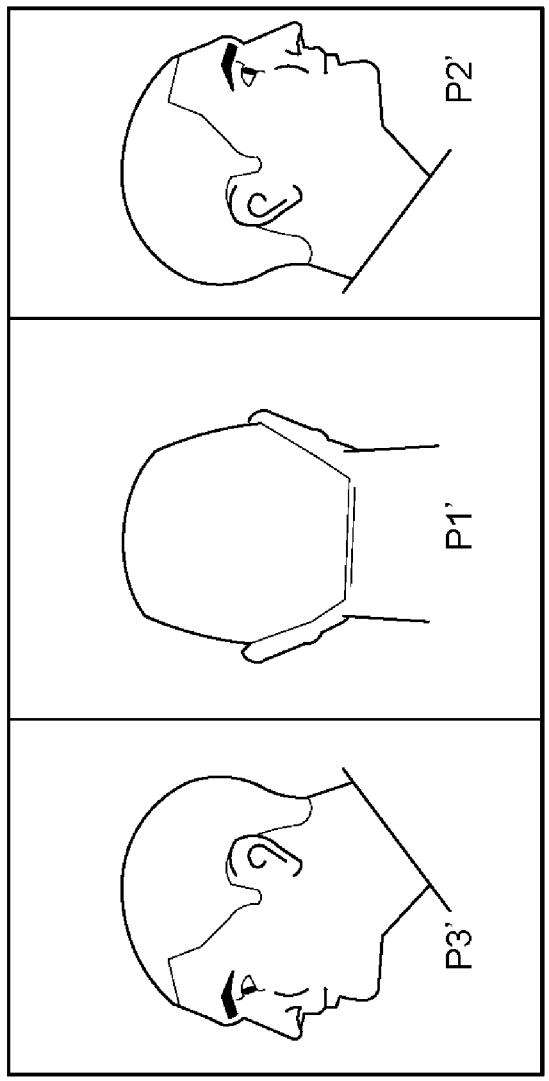
FIG. 4 is a second image diagram of the object captured by the surveillance device.
Figure 5A:
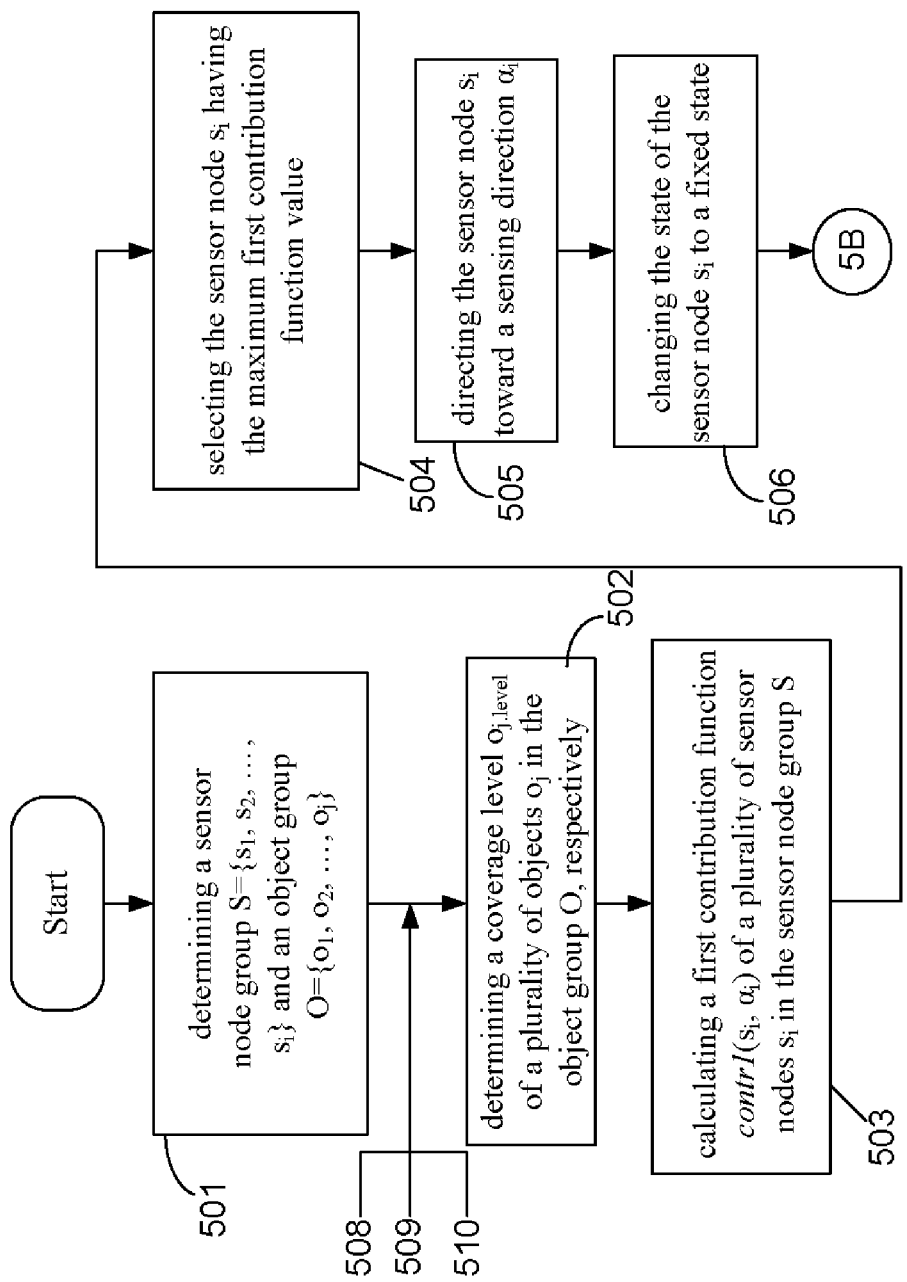
FIG. 5A and FIG. 5B are flow charts of a method for selecting sensor nodes according to the present invention.
Figure 5B:
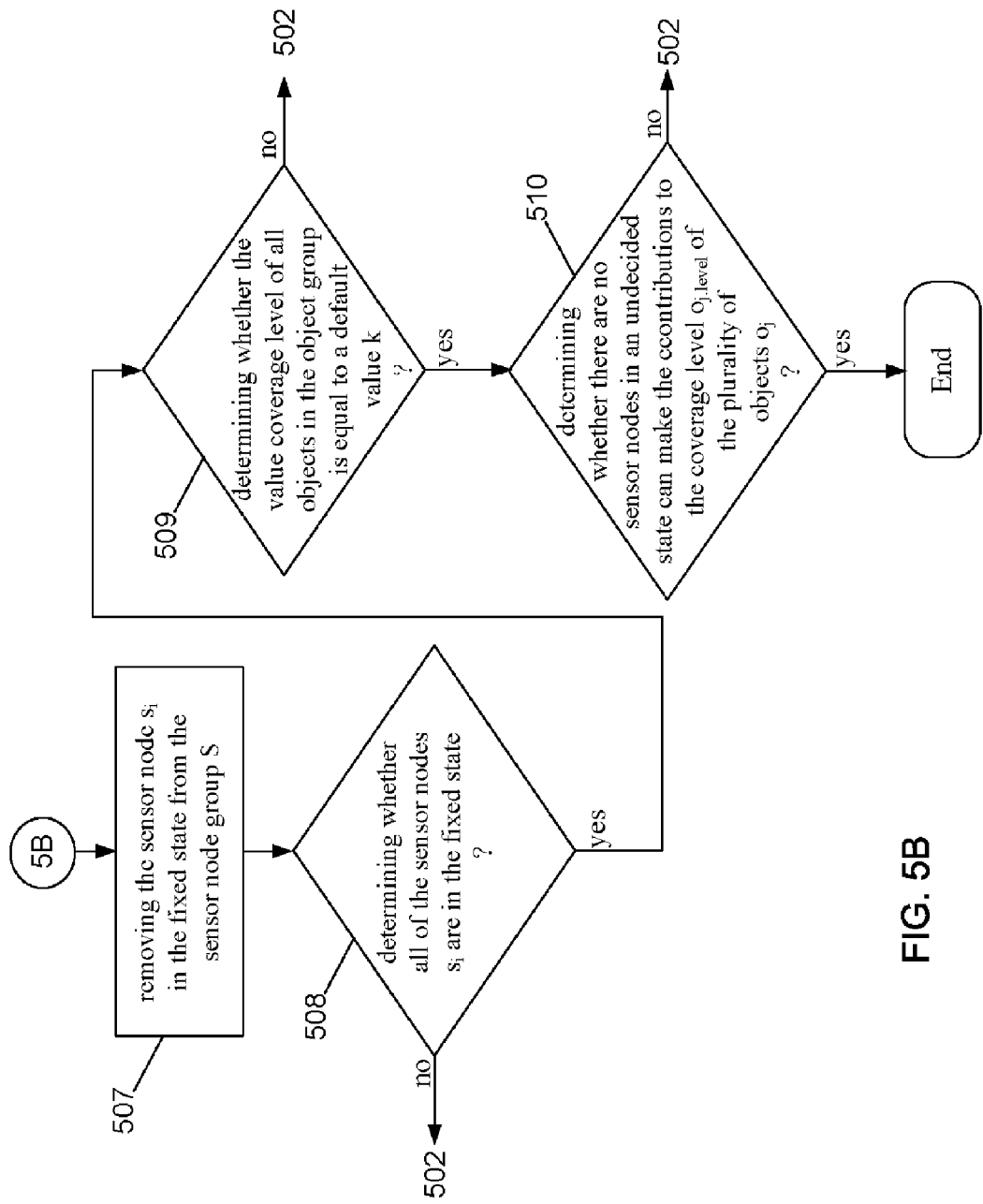
Figure 6A:
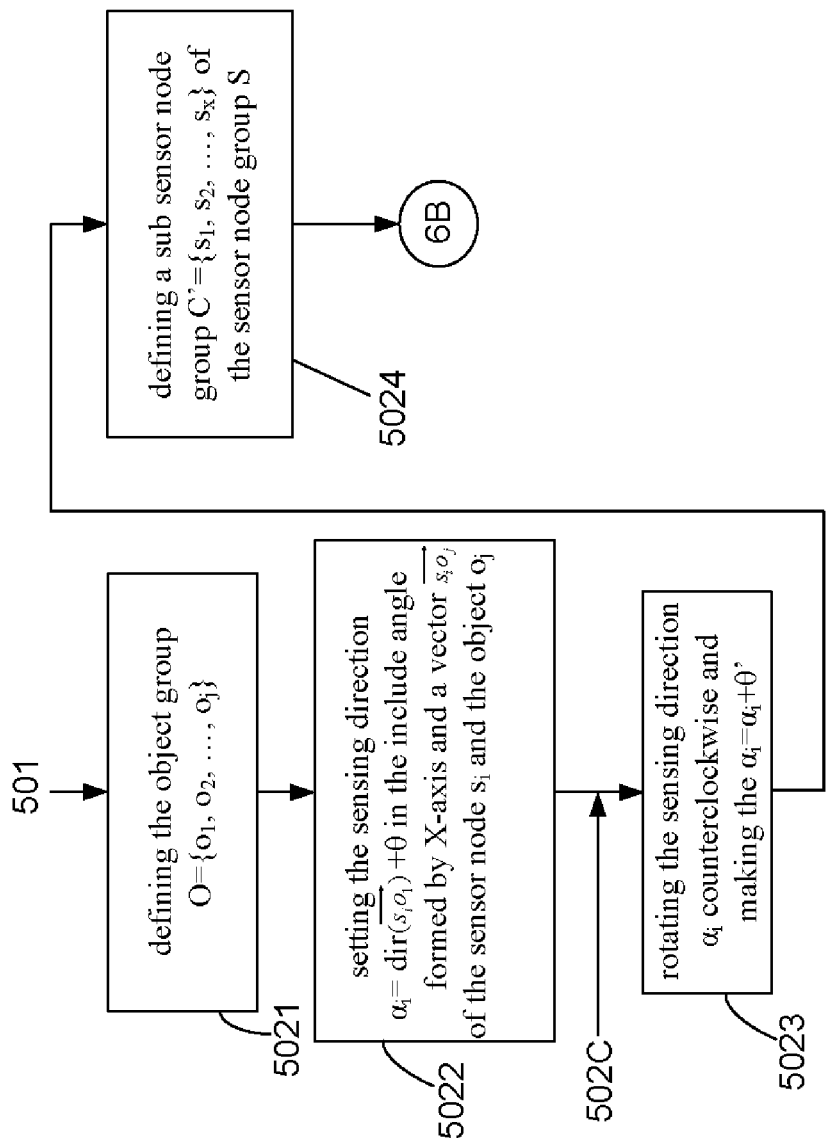
FIG. 6A, FIG. 6B, FIG. 6C, FIG. 6D, and FIG. 6E are detailed flow charts of step (502)
Figure 6B:
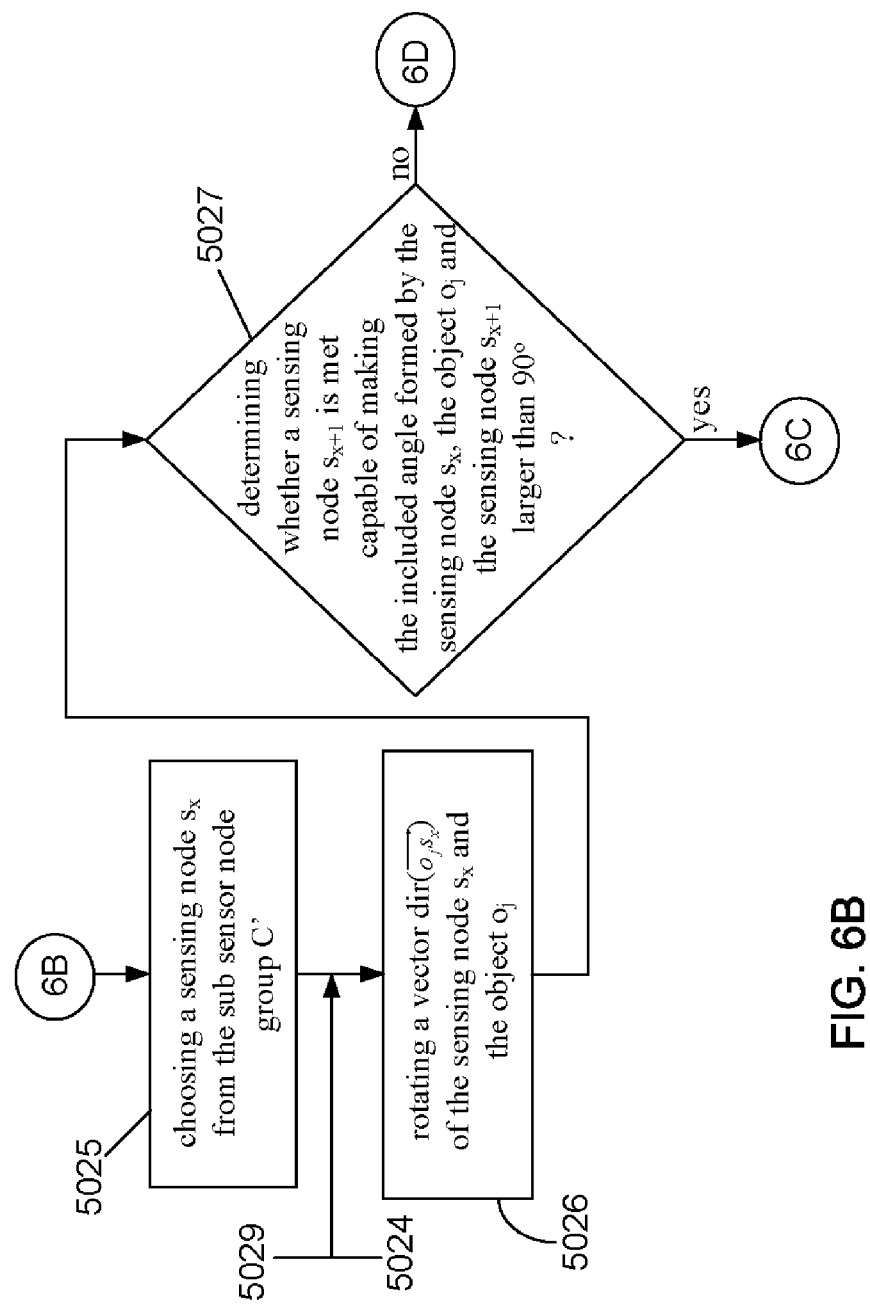
Figure 6C:
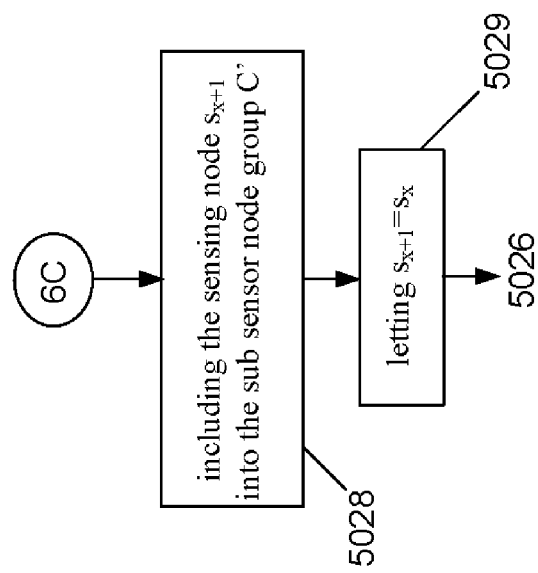
Figure 6D:
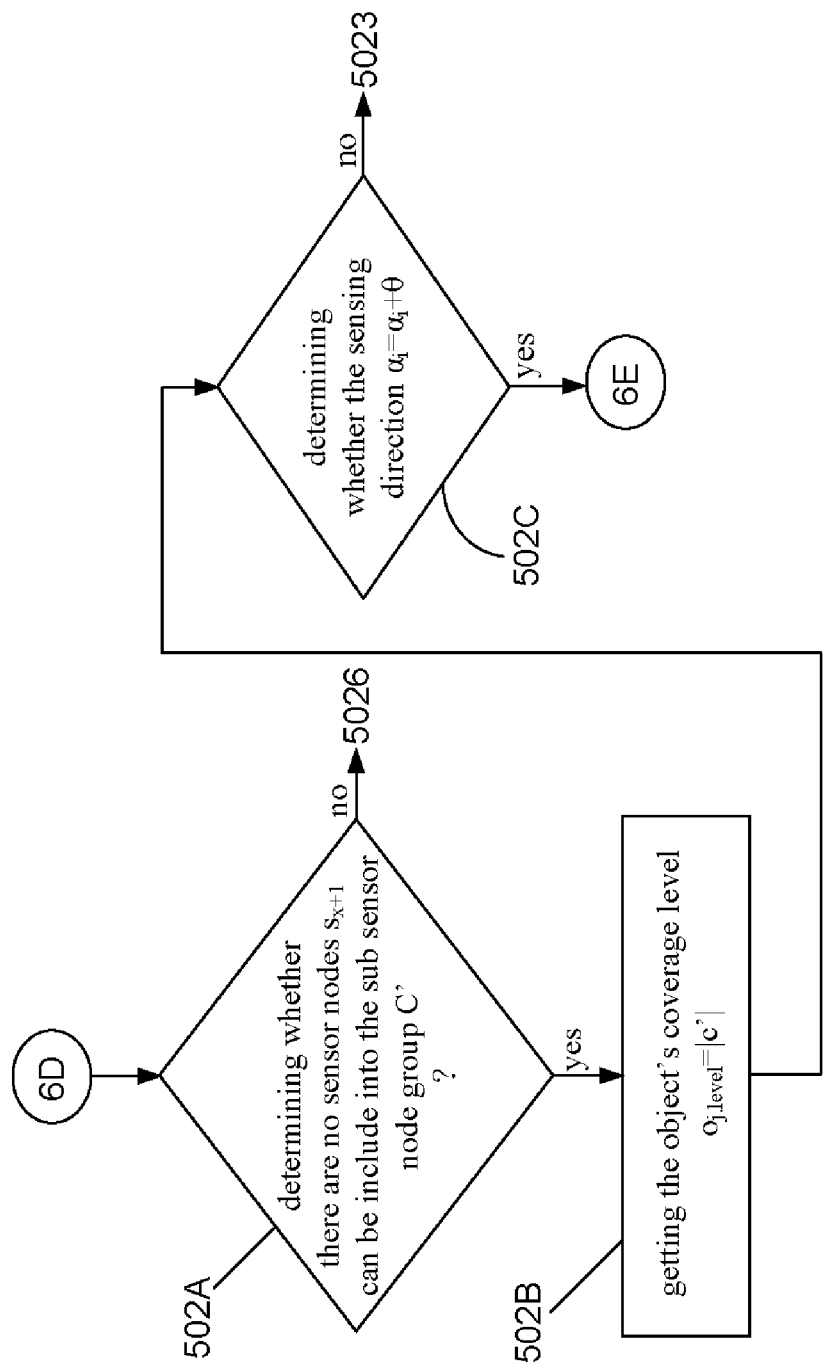
Figure 6E:
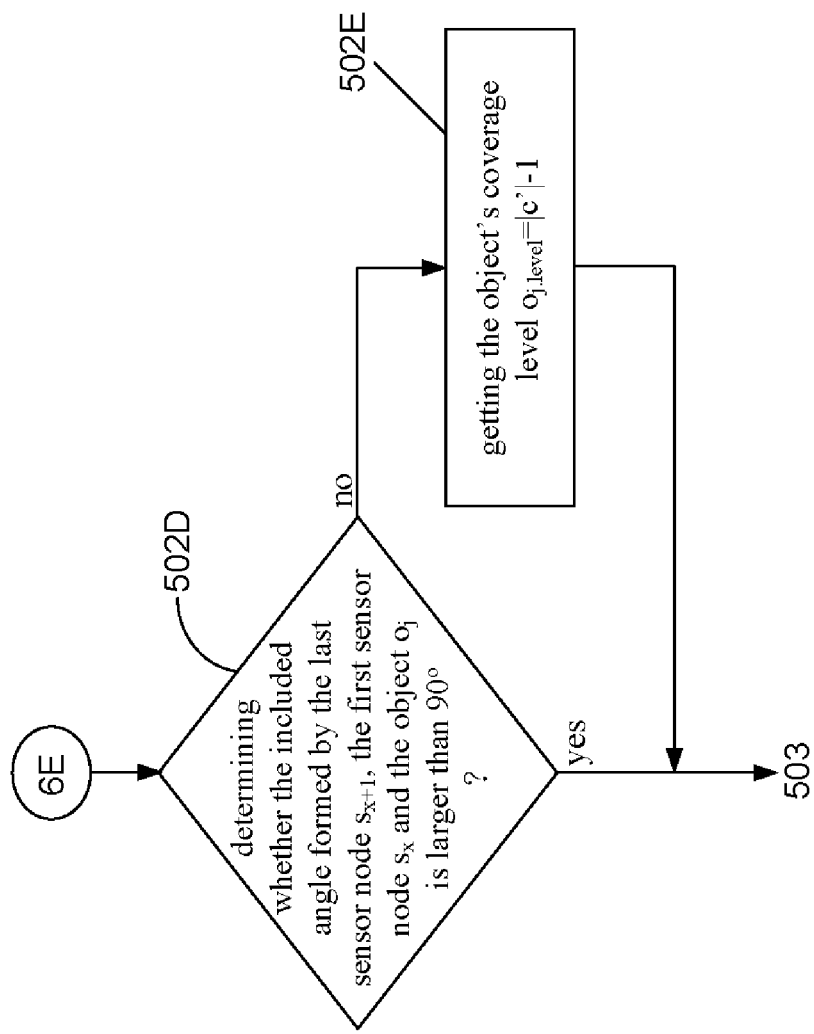

Please refer to FIG. 5A and FIG. 5B, which illustrate flow charts of a method for selecting sensor nodes according to the present invention. As shown in FIG. 5A and FIG. 5B, the method for selecting sensor nodes includes main steps of:

Firstly, executing step (501), determining a sensor node group $S=\{s_1, s_2, \ldots, s_i\}$ and an object group $O=\{o_1, o_2, o_j\}$, and then executing step (502), determining a coverage level $o_{j.level}$ of a plurality of objects $o_j$ in the object group O, respectively. After the step (502) is finished, the flow is proceeded to step (503), calculating a first contribution function contr1 $(s_i, \alpha_i)$ of a plurality of sensor nodes $s_i$ in the sensor node group S; Next proceeding to step (504), selecting the sensor node $s_i$ having the maximum first contribution function value. In the method for selecting sensor nodes, the computing formula of the first contribution function is that:

$$\mathrm{contr1}(si, \alpha_i) = \Sigma(o_{j.level}' - o_{j.level}), \forall o_j$$

wherein the $o_{j.level}'$ means that a new coverage level for the object $o_j$ when adding a new sensor node $s_i$ for providing the sensing coverage to the object $o_j$. When the step (504) is completed, the sensor node $s_i$ having the maximum first contribution value is selected. The flow is next proceeded to step (505) and step (506), which are, directing the sensor node $s_i$ toward a sensing direction $\alpha_i$, and changing the state of the sensor node $s_i$ to a fixed state, respectively.

After the state of sensor node are changed to the fixed state, the flow is continuously proceeded to step (507), removing the sensor node $s_i$ in the fixed state from the sensor node group S, such that the sensor node $s_i$ in the fixed state does not belong to the sensor node group S (the sensor nodes $s_i$ belonging to the sensor node group S are in an undecided state.). Subsequently, the flow is proceeded to step (508), determining whether all of the sensor nodes $s_i$ are in the fixed state, if yes, proceeding to step (509), determining whether the value coverage level of all objects in the object group is equal to a default value k, if yes, proceeding to step (510), determining whether there are no sensor nodes $s_i$ in the undecided state can make the contributions to the coverage level $o_{j.level}$ of the plurality of objects oj, if yes, ending the step. In addition, if the determining result in the determining steps of step (508), step (509) and step (510) is "no", that means the sensor nodes $s_i$ not arranged to perform the best sensing coverage, such that the flow must be repeatedly proceeded to step (502).

Continuously referring to FIG. 6A, FIG. 6B, FIG. 6C, FIG. 6D, and FIG. 6E, which illustrate detailed flow charts of step (502). As shown in FIG. 6A, FIG. 6B, FIG. 6C, FIG. 6D, and FIG. 6E, for the method for selecting sensor nodes described above, the step (502) further includes the detailed steps of:

Firstly, executing step (5021), defining the object group $O=\{o_1, o_2, \ldots, o_j\}$; then executing step (5022), setting the sensing direction $\alpha_i = \mathrm{dir}(\overrightarrow{s_i o_1}) + \theta$ in the include angle formed by X-axis and a vector $\overrightarrow{s_i o_j}$ of the sensor node $s_i$ and the object $o_j$, wherein the sensing coverage radius of each the sensor node $s_i$ is $2\theta$. The detailed flow is next proceeded to step (5023), rotating the sensing direction $\alpha_i$ counterclockwise and making the $\alpha_i = \alpha_i + \theta'$, wherein $\theta'$ means a minimum rotating angle for counterclockwise rotating the sensing direction $\alpha_i$, such that at least one object $o_j$ may enter the sensing coverage radius of the sensor node $s_i$ after the sensing direction $\alpha_i$ is counterclockwise rotated the minimum rotating angle.

Subsequently, the detailed flow is proceeded to step (5024), defining a sub sensor node group $C'=\{s_1, s_2, \ldots, s_x\}$ of the sensor node group S, in which the sensor nodes $s_x$ belonging to the sub sensor node group C' has been sensing-covered the object $o_j$. Next proceeding to step (5025) and step (5026), choosing a sensing node $s_x$ from the sub sensor node group C' and rotating a vector $\overrightarrow{dir(o_j s_x)}$ of the sensing node $s_x$ and the object $o_j$; and then proceeding to step (5027), determining whether a sensing node $s_{x+1}$ is met capable of making the included angle formed by the sensing node $s_x$, the object $o_j$ and the sensing node $s_{x+1}$ larger than 90°, if yes, it means that the sensor node $s_{x+1}$ performs the best sensing coverage to the object $o_j$ and the detailed flow is proceeded to step (5028) and step (5029), that are, including the sensing node $s_{x+1}$ into the sub sensor node group C' and letting $s_{x+1}=s_x$, and repeatedly proceeding to the step (5026).

If the determining result of the determining step of the step (5027) is "no", the detailed flow is proceeded to step (502A), determining whether there are no sensor nodes $s_{x+1}$ can be include into the sub sensor node group C', if yes, proceeding to step (502B), getting the object's coverage level $o_{j.level}=|c'|$; if no, repeatedly proceeding to the step (5026). After the objects' coverage level $o_{j.level}=|C'|$ is got, the detailed flow is proceeded to step (502C), determining whether the sensing direction $\alpha_i=\alpha_i+\theta$, if yes, it means that the sensing direction $\alpha_i$ is rotated counterclockwise to the initial direction thereof, so that the flow must be proceeded to (502D), determining whether the included angle formed by the last sensor node $s_{x+1}$, the first sensor node $s_x$ and the object $o_j$ is larger than 90°, if yes, proceeding to the step (503). Moreover, for the determining step (5023), if the determining result is "no", the detailed flow must be repeatedly proceeded to the step (5023); Besides, for the determining step (502D), if the determining result is "no", the detailed flow is proceeded to step (502E), getting the object's coverage level $o_{j.level}=|c'|-1$.

Figure 7A:
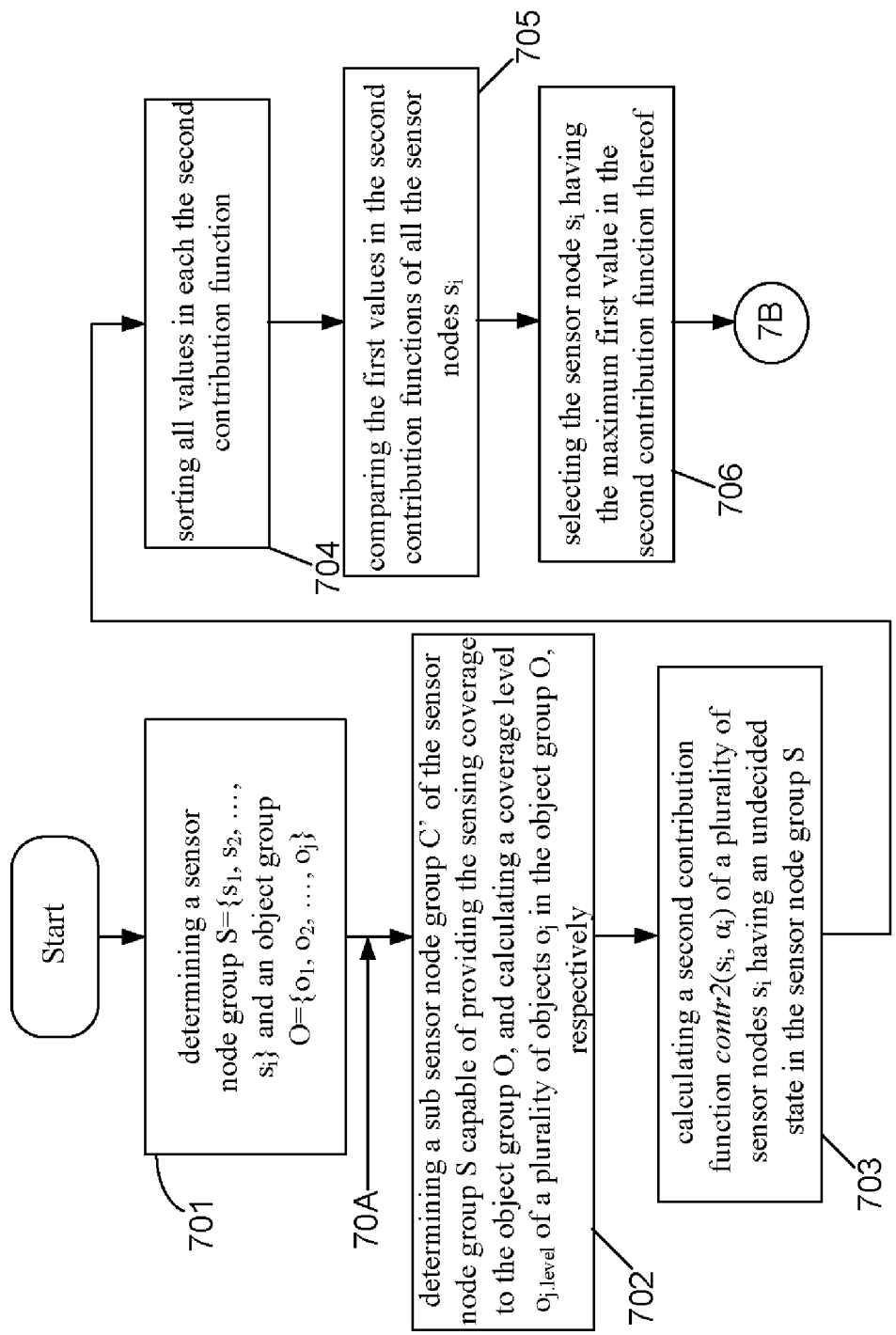
FIG. 7A, FIG. 7B and FIG. 7C are second flow charts of the method for selecting sensor nodes according to the present invention.
Figure 7B:
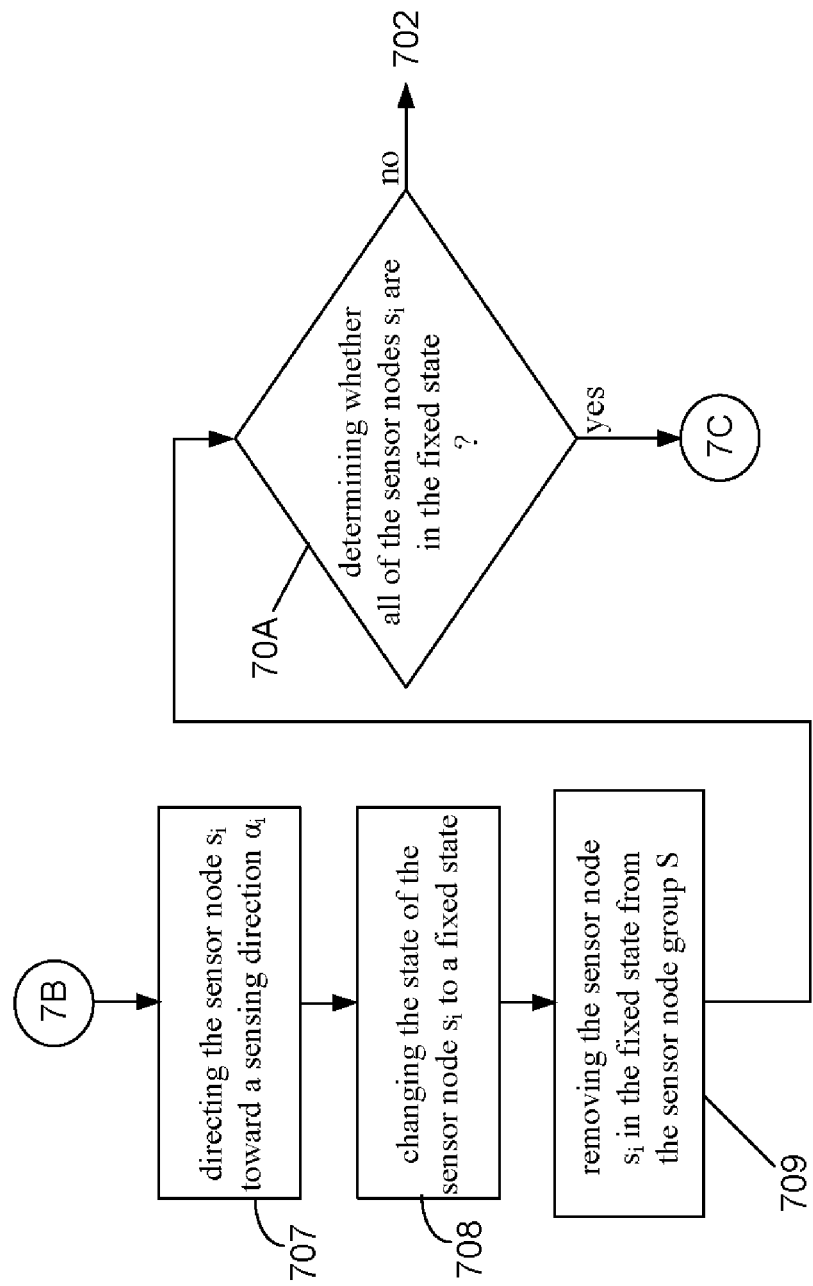
Figure 7C:
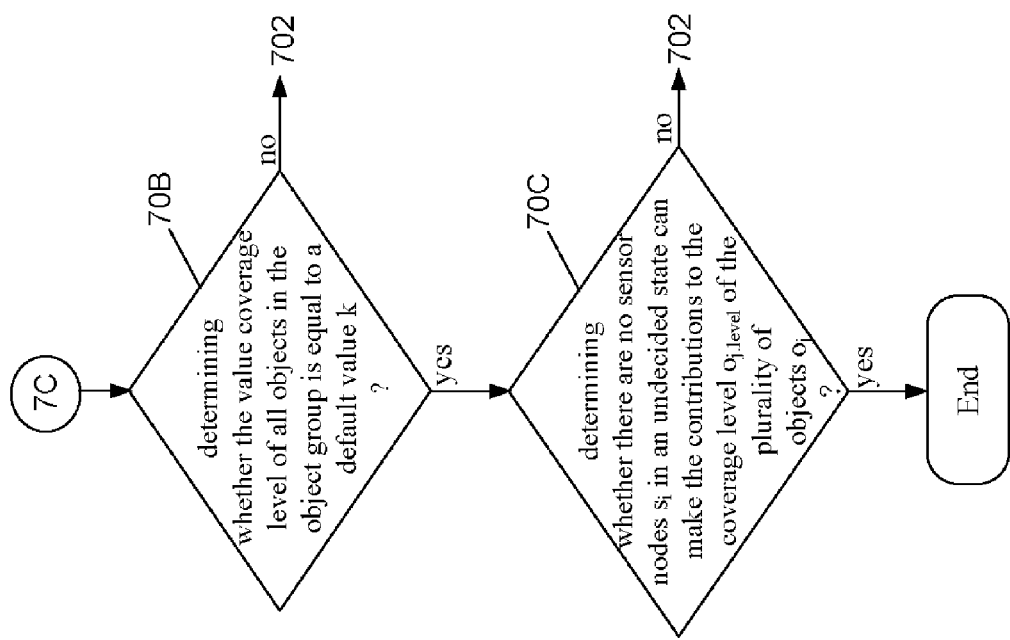

Furthermore, the method for selecting sensor nodes of the present invention also includes a second method. Please refer to FIG. 7A, FIG. 7B and FIG. 7C, which illustrate second flow charts of the method for selecting sensor nodes according to the present invention. As shown in FIG. 7A, FIG. 7B and FIG. 7C, the second method includes the steps of:

Firstly, executing step (701), determining a sensor node group $S=\{s_1, s_2, \ldots, s_i\}$ and an object group $O=\{o_1, o_2, \ldots, o_j\}$; Next, proceeding to step (702), determining a sub sensor node group C' of the sensor node group S capable of providing the sensing coverage to the object group O, and calculating a coverage level $o_{j.level}$ of a plurality of objects $o_j$ in the object group O, respectively. The flow is next proceeded to step (703), calculating a second contribution function $contr2(s_i, \alpha_i)$ of a plurality of sensor nodes $s_i$ having an undecided state in the sensor node group S, wherein the computing formula of the second contribution function $contr2(s_i, \alpha_i)$ is that:

$$contr2(s_i,\alpha_i)=[r_k'-r_k, r_{k-1}'-r_{k-1}, \ldots, r_1'-r_1]$$

wherein the $r_k$ means that a value of the objects' coverage level $o_{j.level}$, in which the value of the coverage level $o_{j.level}$ is equal to the number of the sensor nodes $s_x$ in the fixed state, in addition, the $r_k'$ means that a value of the objects' coverage level $o_{j.level}$ after the sensor node $s_{x+1}$ is included into the sub sensor node group C', in which the value of the coverage level $o_{j.level}$ is equal to the number of the sensor nodes $s_x$ in the fixed state.

After the second continuation functions of all the undecided sensor node $s_i$ are calculated, the flow is continuously proceeded to step (704), sorting all values in each the second contribution function; then the flow is proceeded to step (705), comparing the first values in the second contribution functions of all the sensor nodes $s_1$. Subsequently, proceeding to step (706), selecting the sensor node $s_i$ having the maximum first value in the second contribution function thereof; Therefore, after the step (706) is finished, the sensor nodes $s_i$ able to sensing-cover the objects $o_j$ are selected.

(1) Continuously executing step (707), directing the sensor node $s_i$ toward a sensing direction and subsequently proceeding to step (708), changing the state of the sensor node $s_i$ to a fixed state. Next, the flow is proceeded to step (709), removing the sensor node $s_i$ in the fixed state from the sensor node group S. Eventually, the flow is proceeded to step (70A), determining whether all of the sensor nodes $s_i$ are in the fixed state, if yes, proceeding to step (70B), determining whether the value coverage level of all objects in the object group is equal to a default value k, if yes, proceeding to step (70C), determining whether there are no sensor nodes $s_i$ in an undecided state can make the contributions to the coverage level $o_{j.level}$ of the plurality of objects $o_j$, if yes, ending the step. Moreover, if the determining result in the determining steps of step (70A), step (70B) and step (70C) is "no", the flow must be repeatedly proceeded to step (702).

Figure 8A:
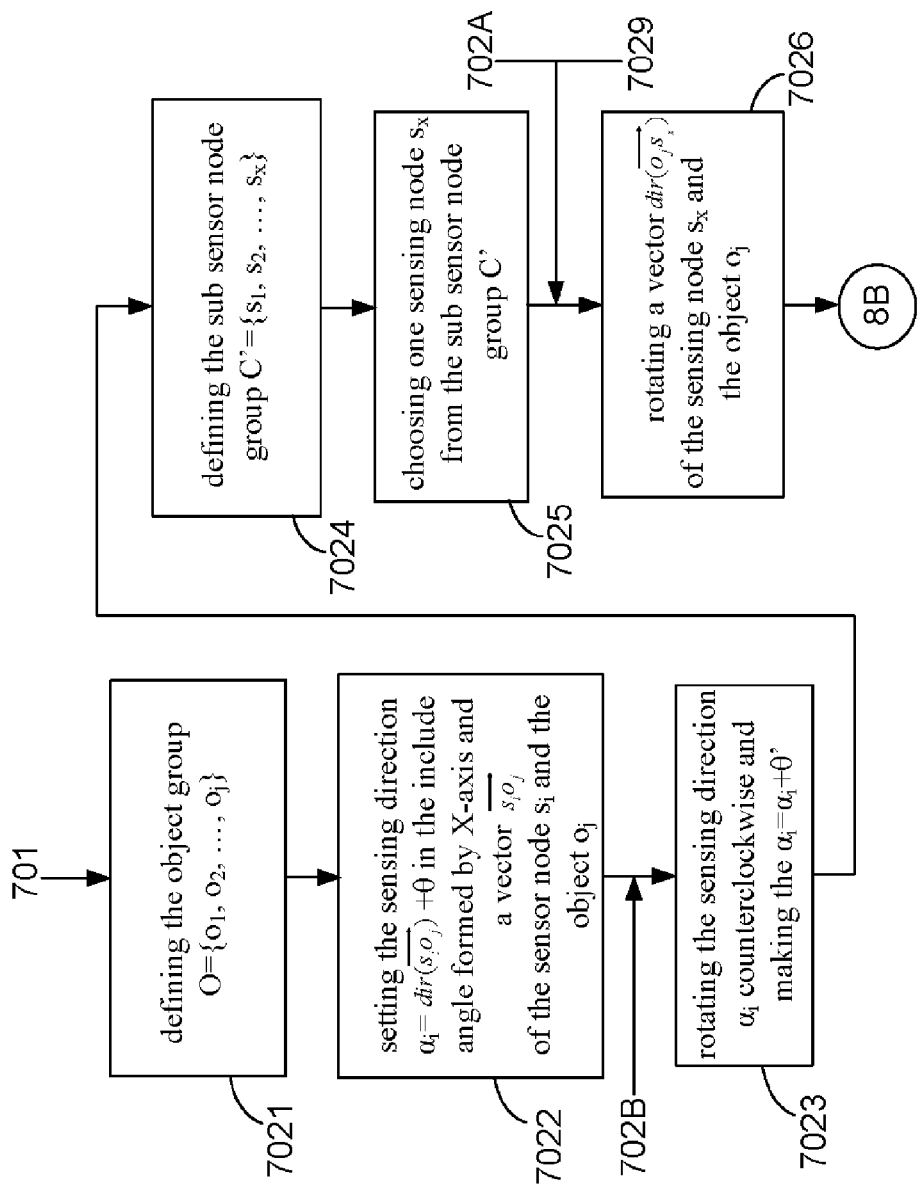
FIG. 8A, FIG. 8B and FIG. 8C are detailed flow charts of step (702).
Figure 8B:
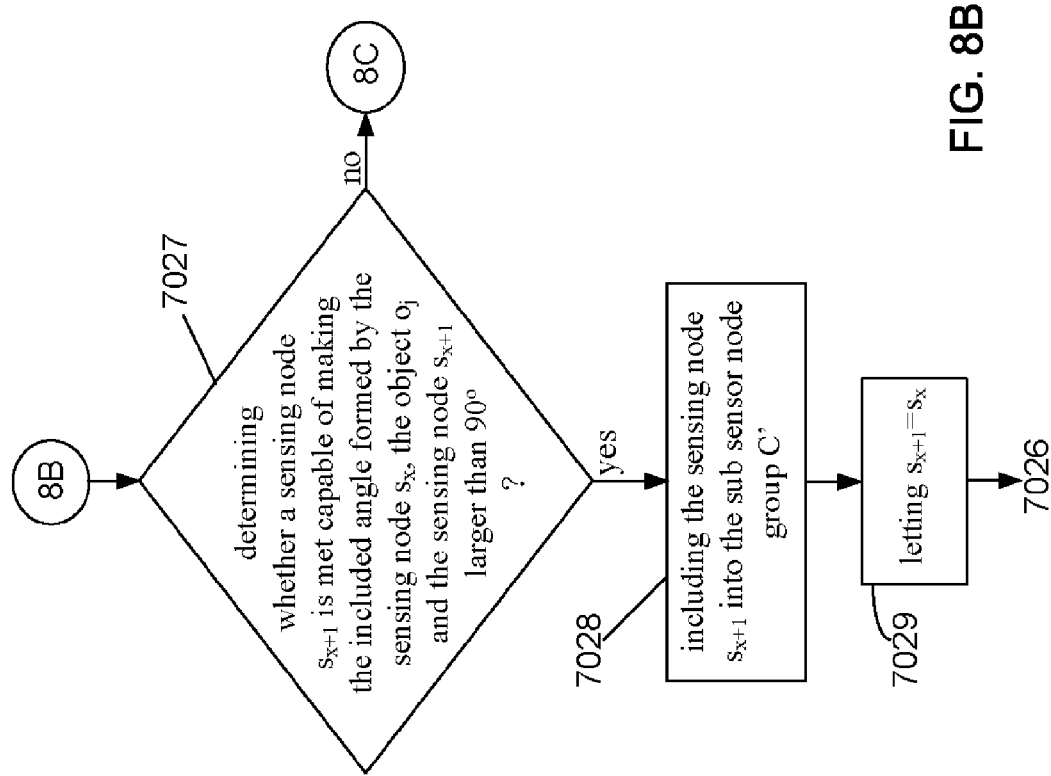
Figure 8C:
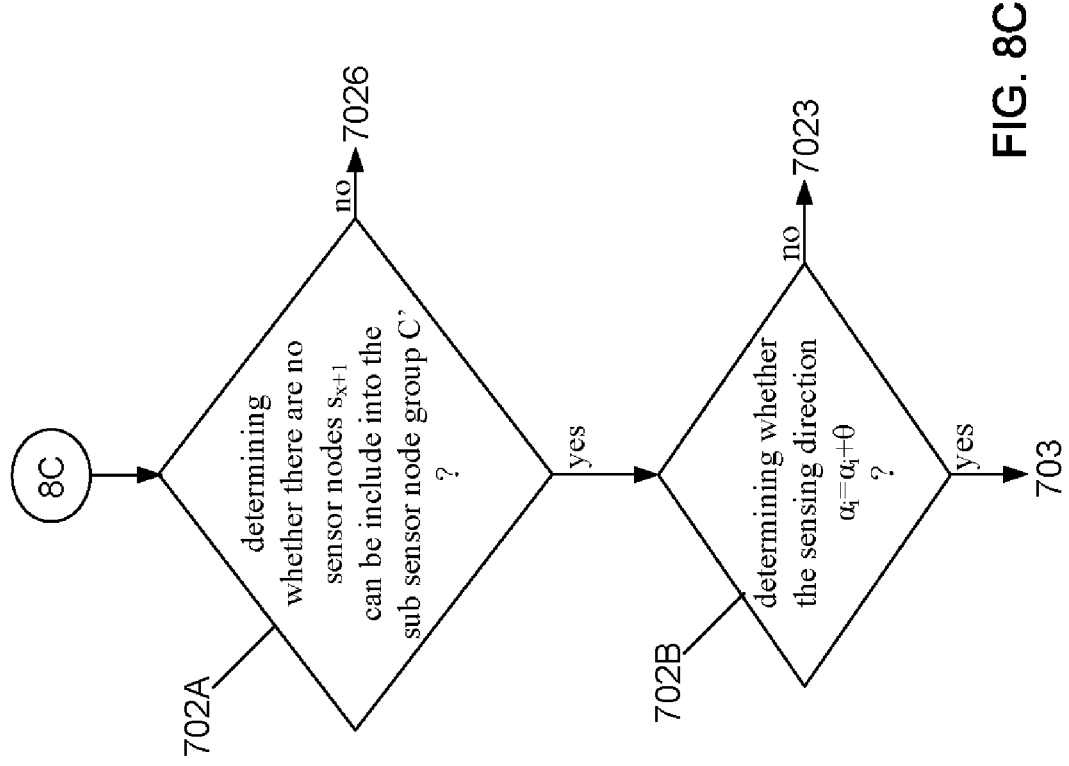

Please refer to FIG. 8A, FIG. 8B and FIG. 8C, which illustrate the detailed flow charts of the step (702). As shown in FIG. 8A, FIG. 8B and FIG. 8C, the step (702) further includes the steps of:

Firstly, the detailed flow is proceeded to step (7021), defining the object group $O=\{o_1, o_2, \ldots, o_j\}$; Next proceeding to step (7022), setting the sensing direction $\alpha_i=dir(\overrightarrow{s_i o_1})+\theta$ in the include angle formed by X-axis and a vector $\overrightarrow{s_i o_j}$ of the sensor node $s_i$ and the object $o_j$; Then proceeding to step (7023), rotating the sensing direction $\alpha_i$ counterclockwise and making the $\alpha_i=\alpha_i+\theta'$, wherein the $\theta'$ means a minimum rotating angle for counterclockwise rotating the sensing direction $\alpha_i$, such that at least one object $o_j$ may enter the sensing coverage radius of the sensor node $s_i$.

Continuously proceeding to step (7024), defining the sub sensor node group $C'=\{s_1, s_2, \ldots, s_x\}$, in which the sensor nodes $s_x$ belonging to the sub sensor node group C' has been sensing-covered the object $o_j$. The detailed flow is next proceeded to step (7025), choosing one sensing node $s_x$ from the sub sensor node group C', then proceeding to step (7026), rotating a vector $\overrightarrow{dir(o_j s_x)}$ of the sensing node $s_x$ and the object $o_j$. Subsequently, the flow is proceeded to step (7027), determining whether a sensing node $s_{x+1}$ is met capable of making the included angle formed by the sensing node $s_x$, the object $o_j$ and the sensing node $s_{x+1}$ larger than 90°, if yes, proceeding to step (7028) and (7029), that are, including the sensing node $s_{x+1}$ into the sub sensor node group C' and letting $s_{x+1}=s_x$, and repeatedly proceeding to the step (7026).

If the determining result of the determining step of the step (7027) is "no", the detailed flow is proceeded to step (702A), determining whether there are no sensor nodes $s_{x+1}$ can be include into the sub sensor node group C', if yes, proceeding to step (702B), determining whether the sensing direction $\alpha_i=\alpha_i+\theta$, if yes, proceeding to the step (703), otherwise, repeatedly proceeding to the step (7023).

Thus, through the above descriptions, the method for selecting sensor nodes of the present invention has been disclosed completely and clearly. In summary, the present invention has the following advantages:

1. In the first method for selecting sensor nodes, a coverage level $o_{j.level}$ of the plurality of objects $o_j$ made by the plurality of sensor nodes $s_i$ would be determined and the first contribution function values for the objects $o_j$ contributed by the sensor nodes $s_i$ would also be calculated, so that the sensor nodes $s_i$ having maximum contribution to the objects $o_j$ can be selected and arranged in a specific environment, and the sensing direction of those sensor nodes $s_i$ can be adjusted for making the sensor node group S performs the best efficiency.

2. In the second method for selecting sensor nodes, a sub sensor node group C' capable of sensing covering an object group O would be arranged and the value of the second contribution function for the objects $o_j$ contributed by the sensor nodes $s_i$ would also be calculated, such that the sensor nodes $s_i$ having maximum contribution to the objects $o_j$ can be selected and arranged in the specific environment, and the sensing direction of those sensor nodes $s_i$ can be adjusted for making the sensor node group S performs the best efficiency.

3. The method for selecting sensor nodes is capable of applying to a wireless sensor network, so as to make the wireless sensing network performs the best sensing efficiency, in addition, the method also can be implemented into a surveillance system having the wireless sensor network.

The above description is made on embodiments of the present invention. However, the embodiments are not intended to limit scope of the present invention, and all equivalent implementations or alterations within the spirit of the present invention still fall within the scope of the present invention.

We claim:

1. A method for selecting sensor nodes, comprising steps of:
   (1) determining a sensor node group $S=\{s_1, s_2, \ldots, s_i\}$ and an object group $O=\{o_1, o_2, \ldots, o_j\}$;
   (2) determining a coverage level $o_{j.level}$ of a plurality of objects $o_j$ in the object group O, respectively;
   (3) calculating a first contribution function of a plurality of sensor nodes $s_i$ in the sensor node group S;
   (4) selecting the sensor node $s_i$ having the maximum first contribution function value;
   (5) directing the sensor node $s_i$ toward a sensing direction $\alpha_i$;
   (6) changing the state of the sensor node $s_i$ to a fixed state;
   (7) removing the sensor node $s_i$ in the fixed state from the sensor node group S;
   (8) determining whether all of the sensor nodes $s_i$ are in the fixed state, if yes, proceeding to step (9), otherwise, repeatedly proceeding to the step (2);
   (9) determining whether the value coverage level of all objects in the object group is equal to a default value k, if yes, proceeding to step (10), otherwise, repeatedly proceeding to the step (2); and
   (10) determining whether there are no sensor nodes $s_i$ in an undecided state can make the contributions to the coverage level $o_{j.level}$ of the plurality of objects $o_j$, if yes, ending the step, otherwise, repeatedly proceeding to the step (2); wherein the computing formula of the first contribution function is that: $contr1(s_i, \alpha_i)=\Sigma(o_{j.level}'-o_{j.level})$, $\forall o_j$.

2. The method for selecting sensor nodes of claim 1, wherein $o_{j.level}'$ means that a new coverage level for the object $o_j$ when adding a new sensor node $s_i$ for providing the sensing coverage to the object $o_j$.

3. The method for selecting sensor nodes of claim 1, wherein the step (2) further comprises the steps of:
   (21) defining the object group $O=\{o_1, o_2, \ldots, o_j\}$;
   (22) setting the sensing direction $\alpha_i=dir(\vec{s_i o_1})+\theta$ in the include angle formed by X-axis and a vector $\vec{s_i o_j}$, of the sensor node $s_i$ and the object $o_j$;
   (23) rotating the sensing direction $\alpha_i$ counterclockwise and making the $\alpha_i=\alpha_i+\theta'$;
   (24) defining a sub sensor node group $C'=\{s_1, s_2, \ldots, s_x\}$ of the sensor node group S;
   (25) choosing a sensing node $s_x$ from the sub sensor node group C';
   (26) rotating a vector $dir(\vec{o_j s_x})$ of the sensing node $s_x$ and the object $o_j$;
   (27) determining whether a sensing node $s_{x+1}$ is met capable of making the included angle formed by the sensing node $s_x$, the object $o_j$ and the sensing node $s_{x+1}$ larger than 90°, if yes, proceeding to step (28), otherwise, proceeding to step (2A);
   (28) including the sensing node $s_{x+1}$ into the sub sensor node group C';
   (29) letting $s_{x+1}=s_x$, and repeatedly proceeding to the step (26);
   (2A) determining whether there are no sensor nodes $s_{x+1}$ can be include into the sub sensor node group C', if yes, proceeding to step (2B), otherwise, repeatedly proceeding to the step (26);
   (2B) getting the object's coverage level $o_{j.level}=|c'|$;
   (2C) determining whether the sensing direction $\alpha_i=\alpha_i+\theta$, if yes, proceeding to step (2D), otherwise, repeatedly proceeding to the step (23);
   (2D) determining whether the included angle formed by the last sensor node $s_{x+1}$, the first sensor node $s_x$, and the object $o_j$ is larger than 90°, if yes, proceeding to the step (3), otherwise, proceeding to step (2E); and
   (2E) getting the object's coverage level $o_{j.level}=|c'|-1$.

4. The method for selecting sensor nodes of claim 3, wherein $\theta'$ means a minimum rotating angle for counterclockwise rotating the sensing direction $\alpha_i$, such that at least one object $o_j$ may enter the sensing coverage radius of the sensor node $s_i$ after the sensing direction $\alpha_i$ is counterclockwise rotated the minimum rotating angle.

5. The method for selecting sensor nodes of claim 3, wherein $\theta'$ means a minimum rotating angle for counterclockwise rotating the sensing direction $\alpha_i$, such that at least one object $o_j$ may quit the sensing coverage radius of the sensor node $s_i$ after the sensing direction $\alpha_i$ is counterclockwise rotated the minimum rotating angle.

6. The method for selecting sensor nodes of claim 3, wherein $\theta'$ means a minimum rotating angle for counterclockwise rotating the sensing direction $\alpha_i$, such that at least one object $o_j$ may enter the sensing coverage radius of the sensor node $s_i$ and at least one object $o_j$ may quit the sensing coverage radius of the sensor node $s_i$ after the sensing direction $\alpha_i$ is counterclockwise rotated the minimum rotating angle.

7. The method for selecting sensor nodes of claim 3, wherein the sensing coverage radius of each the sensor node $s_i$ is $2\theta$.

8. A method for selecting sensor nodes, comprising steps of:
   (A) determining a sensor node group $S=\{s_1, s_2, \ldots, s_i\}$ and an object group $O=\{o_1, o_2, \ldots, o_j\}$;
   (B) determining a sub sensor node group C' of the sensor node group S capable of providing the sensing coverage to the object group O, and calculating a coverage level $o_{j.level}$ of a plurality of objects $o_j$ in the object group O, respectively;

(C) calculating a second contribution function of a plurality of sensor nodes $s_i$ having an undecided state in the sensor node group S;

(D) sorting all values in each the second contribution function;

(E) comparing the first values in the second contribution functions of all the sensor nodes $s_i$;

(F) selecting the sensor node $s_i$ having the maximum first value in the second contribution function thereof;

(G) directing the sensor node $s_i$ toward a sensing direction $\alpha_i$;

(H) changing the state of the sensor node $s_i$ to a fixed state;

(I) removing the sensor node $s_i$ in the fixed state from the sensor node group S;

(J) determining whether all of the sensor nodes $s_i$ are in the fixed state, if yes, proceeding to step (K), otherwise, repeatedly proceeding to the step (B);

(K) determining whether the number of the value coverage level of all objects in the object group is equal to a default value k, if yes, proceeding to step (L), otherwise, repeatedly proceeding to the step (B); and (L) determining whether there are no sensor nodes $s_i$ in an undecided state can make the contributions to the coverage level $o_{j.level}$ of the plurality of objects $o_j$, if yes, ending the step, otherwise, repeatedly proceeding to the step (B); wherein the computing formula of the second contribution function is that: $contr2(s_i, \alpha_i)=[r_k'-r_k, r_{k-1}'-r_{k-1}, \ldots, r_1'-r_1]$.

9. The method for selecting sensor nodes of claim 8, wherein the step (B) further comprises the steps of:

(B1) defining the object group $O=\{o_1, o_2, \ldots, o_j\}$;

(B2) setting the sensing direction $\alpha_i=dir(\overrightarrow{s_i o_1})+\theta$ in the include angle formed by X-axis and a vector $\overrightarrow{s_i o_j}$ of the sensor node $s_i$ and the object $o_j$;

(B3) rotating the sensing direction $\alpha_i$ counterclockwise and making the $\alpha_i=\alpha_i+\theta'$;

(B4) defining the sub sensor node group $C'=\{s_1, s_2, \ldots, s_x\}$;

(B5) choosing one sensing node $s_x$ from the sub sensor node group C';

(B6) rotating a vector $dir(\overrightarrow{o_j s_x})$ of the sensing node $s_x$ and the object $o_j$;

(B7) determining whether a sensing node $s_{x+1}$ is met capable of making the included angle formed by the sensing node $s_x$, the object $o_j$ and the sensing node $s_{x+1}$ larger than 90°, if yes, proceeding to step (B8), otherwise, proceeding to step (BA);

(B8) including the sensing node $s_{x+1}$ into the sub sensor node group C';

(B9) letting $s_{x+1}=s_x$, and repeatedly proceeding to the step (B6);

(BA) determining whether there are no sensor nodes $s_{x+1}$ can be include into the sub sensor node group if yes, proceeding to step (BB), otherwise, repeatedly proceeding to the step (B6); and (BB) determining whether the sensing direction $\alpha_i=\alpha_i+\theta$, if yes, proceeding to the step (C), otherwise, repeatedly proceeding to the step (B3).

10. The method for selecting sensor nodes of claim 8, wherein the $r_k$ means that a value of the objects' coverage level $o_{j.level}$, in which the value of the coverage level $o_{j.level}$ is equal to the number of the sensor nodes $s_x$ in the fixed state; in addition, the $r_k'$ means that a value of the objects' coverage level $o_{j.level}$ after the sensor node $s_{x+1}$ is included into the sub sensor node group C', in which the value of the coverage level $o_{j.level}$ is equal to the number of the sensor nodes $s_x$ in the fixed state.

11. The method for selecting sensor nodes of claim 9, wherein θ' means a minimum rotating angle for counterclockwise rotating the sensing direction $\alpha_i$, such that at least one object $o_j$ may enter the sensing coverage radius of the sensor node $s_i$.

12. The method for selecting sensor nodes of claim 9, wherein the sensing coverage radius of each the sensor node $s_i$ is 2θ.

* * * * *